(12) United States Patent
Waltermann et al.

(10) Patent No.: US 9,501,287 B2
(45) Date of Patent: Nov. 22, 2016

(54) ENABLING ALTERNATE USAGE MODES IN AN OPERATING SYSTEM

(71) Applicant: Lenovo (Singapore) Pte. Ltd., Singapore (SG)

(72) Inventors: Rod D. Waltermann, Rougemont, NC (US); James Anthony Hunt, Chapel Hill, NC (US); Kenneth Scott Seethaler, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 284 days.

(21) Appl. No.: 13/837,555

(22) Filed: Mar. 15, 2013

(65) Prior Publication Data

US 2014/0281444 A1   Sep. 18, 2014

(51) Int. Cl.
G06F 9/00 (2006.01)
G06F 9/24 (2006.01)
G06F 15/177 (2006.01)
G06F 9/44 (2006.01)
G06F 1/16 (2006.01)

(52) U.S. Cl.
CPC ............. *G06F 9/4401* (2013.01); *G06F 1/162* (2013.01); *G06F 9/441* (2013.01)

(58) Field of Classification Search
CPC ...................................................... G06F 9/441
See application file for complete search history.

(56) References Cited

U.S. PATENT DOCUMENTS

| | | | |
|---|---|---|---|
| 7,506,152 B2 * | 3/2009 | Park et al. ............. | 713/100 |
| 7,876,288 B1 * | 1/2011 | Huang ................. | 345/4 |
| 2006/0022950 A1 * | 2/2006 | Friedrichs .............. | 345/169 |
| 2006/0203014 A1 * | 9/2006 | Lev .................. | G06F 1/162 345/659 |
| 2009/0244012 A1 * | 10/2009 | Behar ................. | G06F 1/162 345/169 |
| 2011/0002096 A1 * | 1/2011 | Thorson ............... | 361/679.04 |
| 2011/0013351 A1 * | 1/2011 | Simmons .............. | G06F 1/162 361/679.27 |
| 2012/0243165 A1 * | 9/2012 | Chang et al. ........... | 361/679.27 |
| 2013/0135352 A1 * | 5/2013 | Matsuda et al. ......... | 345/659 |
| 2014/0215201 A1 * | 7/2014 | Pfeifer ................. | 713/100 |

FOREIGN PATENT DOCUMENTS

JP   2004005214 A  *  1/2004

OTHER PUBLICATIONS

HP Touch Smart tm2 Notebook PC—Maintenance and Service Guide, Jan. 2010, Hewlett-Packard.*
HP TouchSmart tm2-1090ed Photos, Hardware info United States.*

* cited by examiner

*Primary Examiner* — Xuxing Chen
(74) *Attorney, Agent, or Firm* — Ference & Associates LLC

(57) ABSTRACT

An embodiment provides an information handling device, including: a display panel and a base component connected by a hinge between the display panel and the base component, the hinge supporting a tent physical configuration and a stand physical configuration; one or more processors; an operating system; and instructions accessible to the one or more processors that when executed provide one or more actions comprising: determining via a first input regarding physical orientation of the information handling device that the operating system is to be operated in a first operational mode that is not supportive of the tent physical configuration or the stand physical configuration; operating the operating system in the first operational mode; and selectively altering a function of the first operational mode after receiving an additional input to support one or more of the tent physical configuration and the stand physical configuration. Other aspects are described and claimed.

19 Claims, 8 Drawing Sheets

ENABLING ALTERNATE USAGE MODES IN AN OPERATING SYSTEM

BACKGROUND

Information handling devices ("devices") come in a variety of forms, for example laptop computing devices, tablet computing devices, smart phones, e-readers, MP3 players, and the like. Many different form factors are available for such devices. Hybrid devices are popular as they combine or integrate more than one form factor. An example of a hybrid device is a clamshell laptop or notebook computer that includes a repositionable display device such that the display device may be rotated and folded or collapsed over the base portion of the system to form a tablet computer. An example of such a device is a LENOVO TWIST device.

Such hybrid devices include an operating system. Generally, the operating systems offer two modes of operation that match the two device use modes, i.e., tablet mode and clamshell mode. The operating systems then include a switching function where the operating system will transition between the two modes depending on the use context. Conventionally the switch is implemented via detecting a device configuration, e.g., using a sensor to infer or determine the device's physical configuration or orientation and thus switch or toggle the operating system modes. The operating system modes or operational modes comprise a set of characteristics, e.g., display device rotation characteristics, display device functionality characteristics, etc., such that on a switch between modes, a set of functions switch by virtue of switching operational modes.

BRIEF SUMMARY

In summary, one aspect provides an information handling device, comprising: a display panel and a base component connected by a hinge between the display panel and the base component, the hinge supporting a tent physical configuration and a stand physical configuration; one or more processors; an operating system; and instructions accessible to the one or more processors that when executed provide one or more actions comprising: determining via a first input regarding physical orientation of the information handling device that the operating system is to be operated in a first operational mode that is not supportive of the tent physical configuration or the stand physical configuration; operating the operating system in the first operational mode; and selectively altering a function of the first operational mode after receiving an additional input to support one or more of the tent physical configuration and the stand physical configuration.

Another aspect provides a method, comprising: in an information handling device having a display panel and a base component connected by a hinge between the display panel and the base component, the hinge supporting a tent physical configuration and a stand physical configuration, determining via a first input regarding physical orientation of the information handling device that an operating system is to be operated in a first operational mode that is not supportive of the tent physical configuration or the stand physical configuration; operating the operating system in the first operational mode; and selectively altering a function of the first operational mode after receiving an additional input to support one or more of the tent physical configuration and the stand physical configuration.

Another aspect provides a method, comprising: determining via a first input regarding physical orientation of an information handling device having a display panel that is rotatable and collapsible with respect to a base component by a hinge that a multimodal operating system is to be placed into a first operational mode; placing the multimodal operating system into the first operational mode; and selectively altering a function of the first operational mode after receiving an additional input.

A further aspect provides a program product, comprising: a computer readable storage medium having computer readable program code stored therewith, the computer readable program code comprising: computer readable program code configured to, in an information handling device having a display panel and a base component connected by a hinge between the display panel and the base component, the hinge supporting a tent physical configuration and a stand physical configuration, determine via a first input regarding physical orientation of the information handling device that an operating system is to be operated in a first operational mode that is not supportive of the tent physical configuration or the stand physical configuration; computer readable program code configured to operate the operating system in the first operational mode; and computer readable program code configured to selectively alter a function of the first operational mode after receiving an additional input to support one or more of the tent physical configuration and the stand physical configuration.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
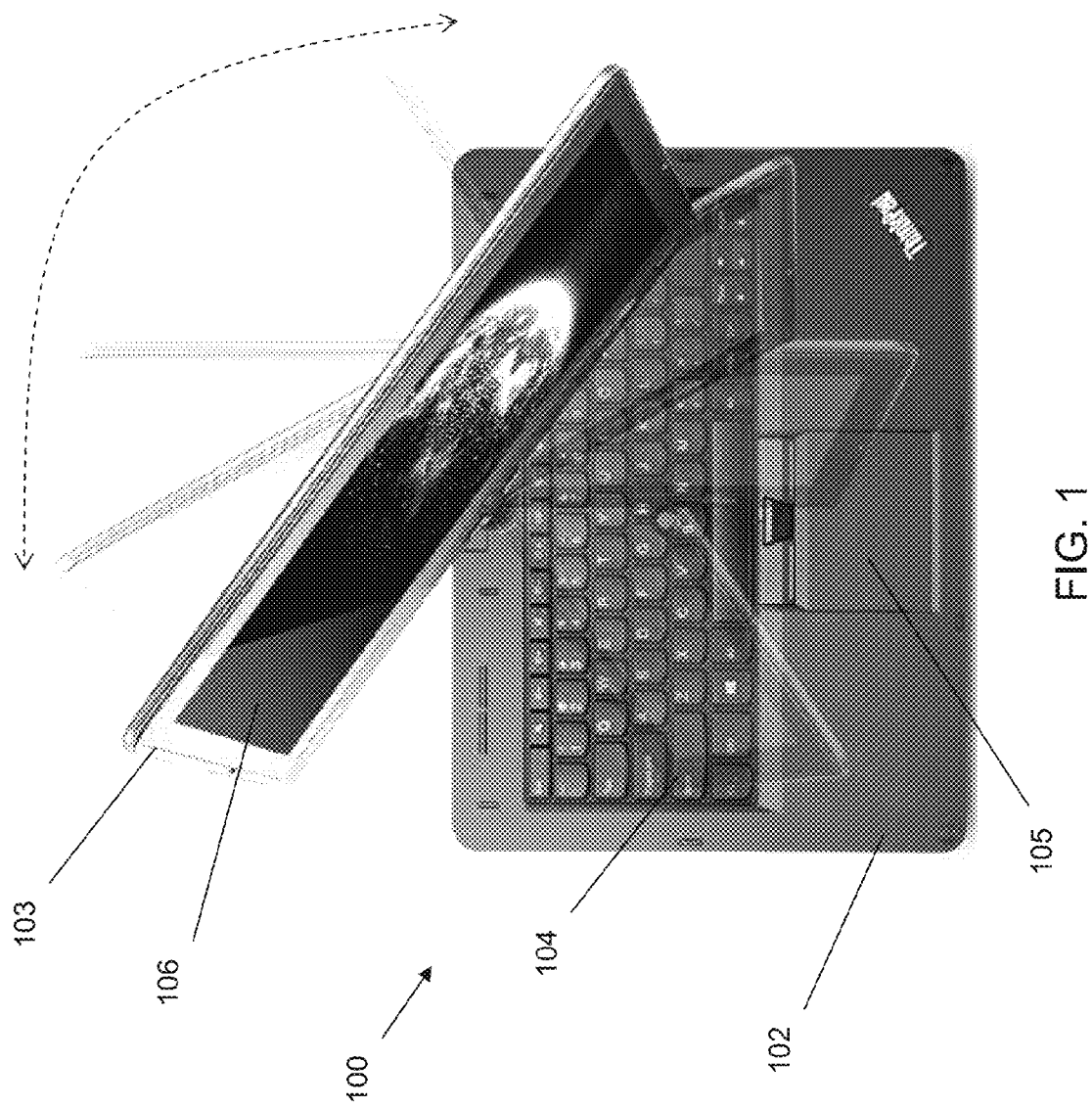
FIG. 1 illustrates an example information handling device with a rotating and collapsible display panel.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Although there are currently available bimodal operating systems that switch between two operational modes to accommodate a hybrid device, e.g., switching between the laptop operational mode and the tablet operational mode, with the variety of devices on the market there is a need to support undefined operating system operational modes. This is because many users operate the device in unexpected operational modes, e.g., such that the operating system does not have an appropriate "mode" to match the use. Examples of unexpected uses include a "tent" or "easel" operational mode and a "stand" operational. These operational modes are possible because of the increased number of physical configurations these hybrid devices may achieve. Thus, stand physical configuration and tent physical configuration are possible, but corresponding operational modes are absent.

In other words, even though hybrid devices have modal operating systems, existing modal operating systems offer only two modes, i.e., clamshell or laptop operational mode and tablet operational mode. Clamshell or laptop operational mode consists of a traditional desktop or notebook or laptop interface experience offered by the operation system. For example, laptop operational mode is an operational mode wherein a set of functions, e.g., a keyboard and mouse functionality, are available, whereas another set of functions, e.g., touch and pen input, are optionally available. Tablet operational mode, on the other hand, attempts to leverage different assumptions regarding this operational mode, e.g., the user does not have access to a traditional keyboard or mouse, and all user input is performed via a touch input or a pen input. Currently then, these two operational modes are the only operational modes that common operating systems support.

Devices may very well extend beyond the traditional tablet device and clamshell device and include devices operated in newly defined operational modes. Recent examples of newly defined operational modes include a stand operational mode and a "tent" or "easel" operational mode. In these operational modes an attached keyboard may be present but due to the unusual system physical configuration/orientation it may not be usable or accessible. In this case it is desirable to enable tablet operational mode within the operating system to allow user input via on screen touch keyboard, as an example. However, within these non-standard or newly defined physical configurations and corresponding operational modes, tablet functions such as auto-screen rotation and default screen orientation need to be disabled. Therefore, an operating system that may switch between two modes (bimodal operating system) will not be able to accommodate operational modes in which neither of the two operational modes (i.e., laptop and tablet) is uniquely sufficient to provide the user with the best experience.

Accordingly, an embodiment provides a convenient and user friendly way to modify a bimodal operating system to accommodate additional operational modes. For example, an embodiment allows a user to modify a bimodal operating system's functionality in various ways to more appropriately address later discovered or otherwise used operational modes not contemplated by the bimodal operating system, i.e., operational modes not contemplated at the time of operating system development. Such modes may be considered as non-traditional operational modes not accommodated by current multimodal operating systems. Examples of non-traditional operational modes include but are not limited to a stand operational mode and a tent or easel operational mode.

The description now turns to the figures in which certain example embodiments are shown. The example embodiments will be best understood with reference to the figures, and these embodiments, described and illustrated, are non-limiting examples of possible embodiments.

Figure 2:
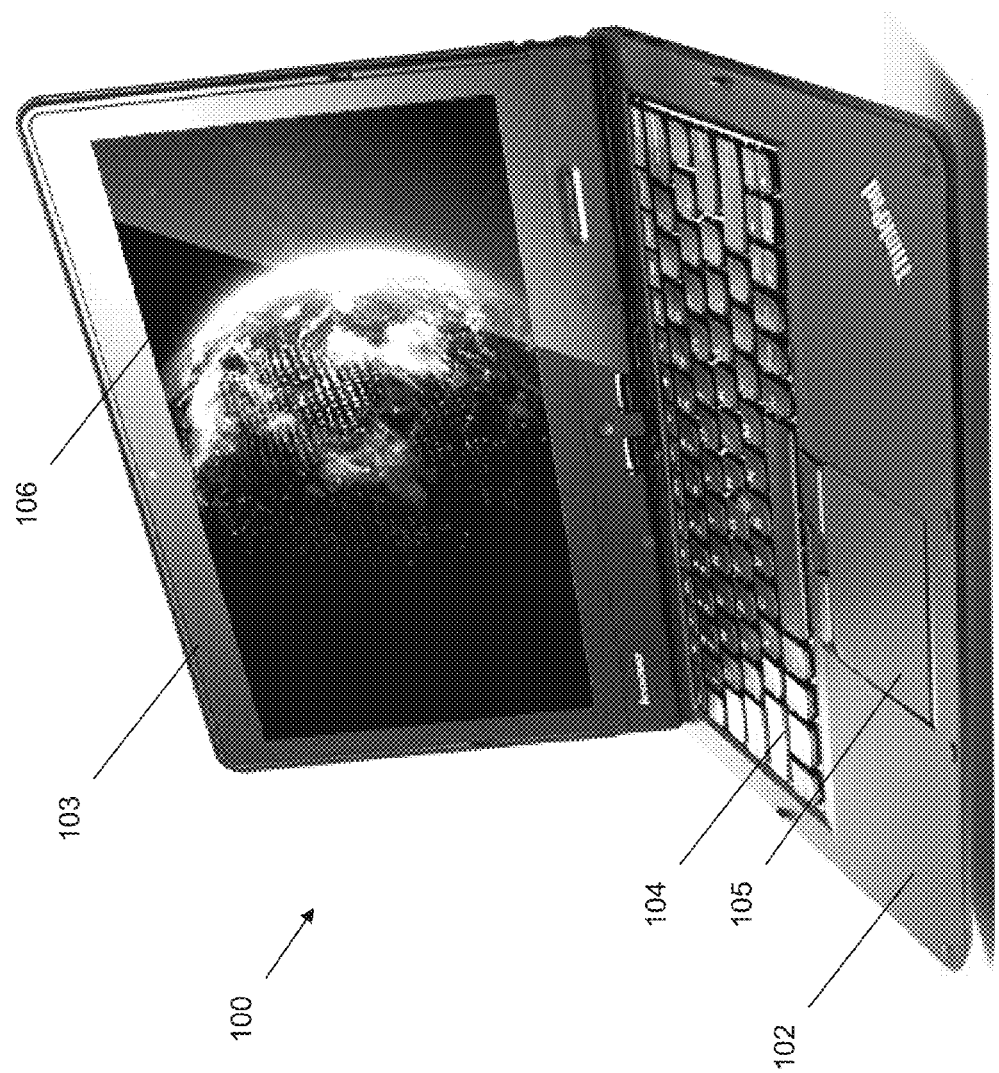
FIG. 2 illustrates an example information handling device with a rotating and collapsible display panel in a laptop physical configuration.
Figure 3:
FIG. 3 illustrates an example information handling device with a rotating and collapsible display panel in a tablet physical configuration.
Figure 4:
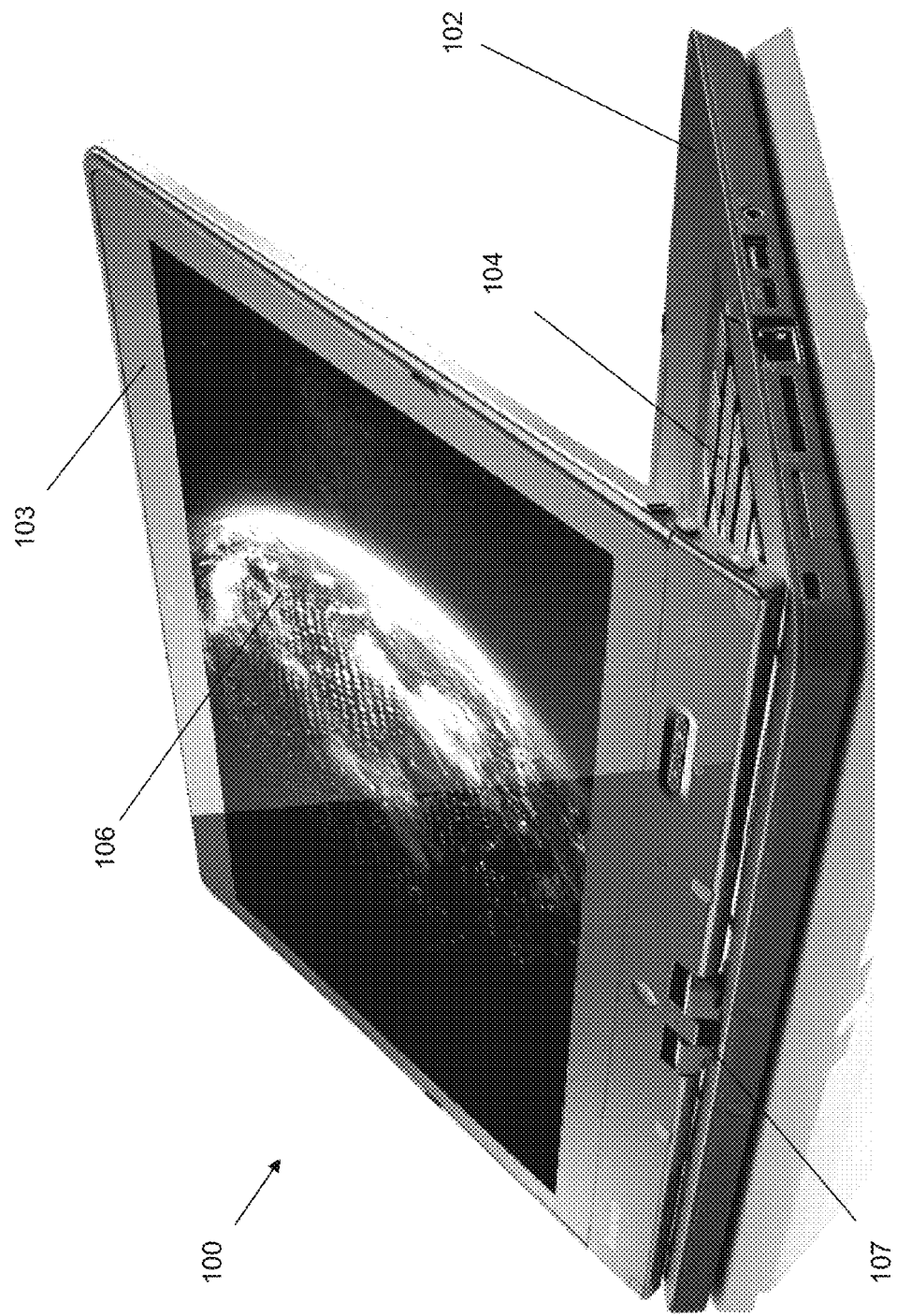
FIG. 4 illustrates an example information handling device with a rotating and collapsible display panel in a stand physical configuration.

FIG. 1 through FIG. 5 illustrates an example multi-modal device 100 in a variety of physical orientations/configurations for use in different operational modes. The device 100 includes a display panel 103 including a display screen 106 (e.g., a touch screen) that may swivel about a connection 107 (e.g., a hinge, refer to FIG. 4) about a base portion or component 102, as indicated by the dashed arrow. The multi-modal device 100 may thus be used in a laptop operational mode, as illustrated by the physical configuration in FIG. 2, or a tablet operational mode, as illustrated in FIG. 3.

In the laptop operational mode the device 100 is in a laptop physical configuration such that the display panel 103 and display screen 106 are opened and facing the user, as is the keyboard 104 and touch panel 104 of the based component 102. In this mode, a bimodal operating system included in the device functions in a laptop operational mode, i.e., a mode customized to maximize a laptop physical configuration. Therefore, the bimodal operation system adjusts various parameters and functions as appropriate for this physical configuration. An example includes accepting input from the keys of the keyboard 104, accepting input from the touch panel 105, locking the display device in a landscape orientation, and the like. Thus, the user is offered the best of the laptop operational mode by the bimodal operating system.

The laptop operational mode may be determined by the bimodal operating system in a variety of ways. For example, magnet based sensors ("hall sensors") may be appropriately placed in the display panel 103 and the base portion 102 such that opening of the clamshell, e.g., as illustrated in FIG. 2, is detected. In response to such detection, the bimodal operating system is set to laptop operational mode and the appropriate parameters or functions of the system are set, as described using the examples herein.

Alternatively, the user may choose to reorient the display panel 103 such that the rear portion of the display panel 103 is adjacent to the keyboard 104 containing surface of the base portion 102, i.e., obtain a tablet physical configuration as illustrated in FIG. 3. Again, the bimodal operating system detects this physical configuration, e.g., using magnet sensors in appropriate locations of the base portion 102 and the display panel 103 and sets the system to operate in tablet operational mode. The tablet operational mode, similar to the laptop operational mode, attempts to maximize the user's experience based on the physical configuration detected. As an example, in the tablet physical orientation/configuration, the bimodal operating system sets the display screen 106 to accept touch based input, as the user will not have access to the keyboard 102, touch panel 105, or other inputs provided by the (now hidden) upper surface of the base portion 102. Again, the bimodal operating system may detect the tablet physical orientation in a variety of ways, e.g., using a variety of sensors or combination of sensors, and set the bimodal operating system appropriately.

As described herein, devices such as device 100 are capable of obtaining additional physical configurations and thus may impact the user's experience if the bimodal operating system is not appropriately configured to handle such physical configurations.

As an example, the device 100 may be placed into a stand physical orientation and a user may wish to use the device 100 in a stand operational mode. A stand physical configuration provides a clamshell like configuration, but with the display panel 103 rotated (e.g., 180 degrees). However, the bimodal operating system does not contemplate a stand operational mode. Depending on the sensors utilized to detect the physical orientation of the device 100, the bimodal operating system may switch to either of the laptop operational mode or the tablet operational mode, as these are the only two choices available.

In the example case of using magnetic sensors, the bimodal operating system may choose the laptop operational mode for the physical configuration of stand operational mode because the magnetic sensors will detect lip opening, and thus the bimodal operating system will exit tablet operational mode and enter laptop operational mode. This may indeed prove problematic for the user, as this mode deactivates the touch screen function of the display screen 106. As will be appreciated, various laptop operational mode parameters will not be appropriate. For example, the user may not use the keyboard 104 in the stand mode, but may nonetheless grab or otherwise provide input thereto. This complicates the user experience and may discourage the user from employing the stand mode.

Figure 5:
FIG. 5 illustrates an example information handling device with a rotating and collapsible display panel in a tent physical configuration.

Similarly, FIG. 5 illustrates an easel or tent physical configuration for the device 100. This is similar to the stand mode, but the device is now stood on its upper and lower edges of the display panel 103 and base portion 102, respectively. Thus, the display screen 106 is now upside down with respect to the laptop operational mode, and again (similar to stand operational mode) the keyboard 104 and other input components are somewhat inaccessible, but may nonetheless be inadvertently interacted with. The bimodal operating system will again (assuming that a magnetic type hall sensor or other proximity sensor) switch to the laptop mode on lid opening. As with the stand operational mode, this may be inappropriate for the physical configuration because, among other reasons, the display screen 106 will be locked in an upside-down fashion corresponding to laptop operational mode.

Accordingly, an embodiment provides for modifying or adapting certain functions of a bimodal operating system. An embodiment thus allows a user to conveniently make use of physical configurations not contemplated or matched by a bimodal operating system. This also prevents a need to design a multimodal operating system to anticipate every possible physical configuration or orientation, which may be costly and not generally applicable to the multitude of form factors available. Additionally, such a multimodal operation system would omit the devices already supplied bimodal operating systems.

Figure 6:
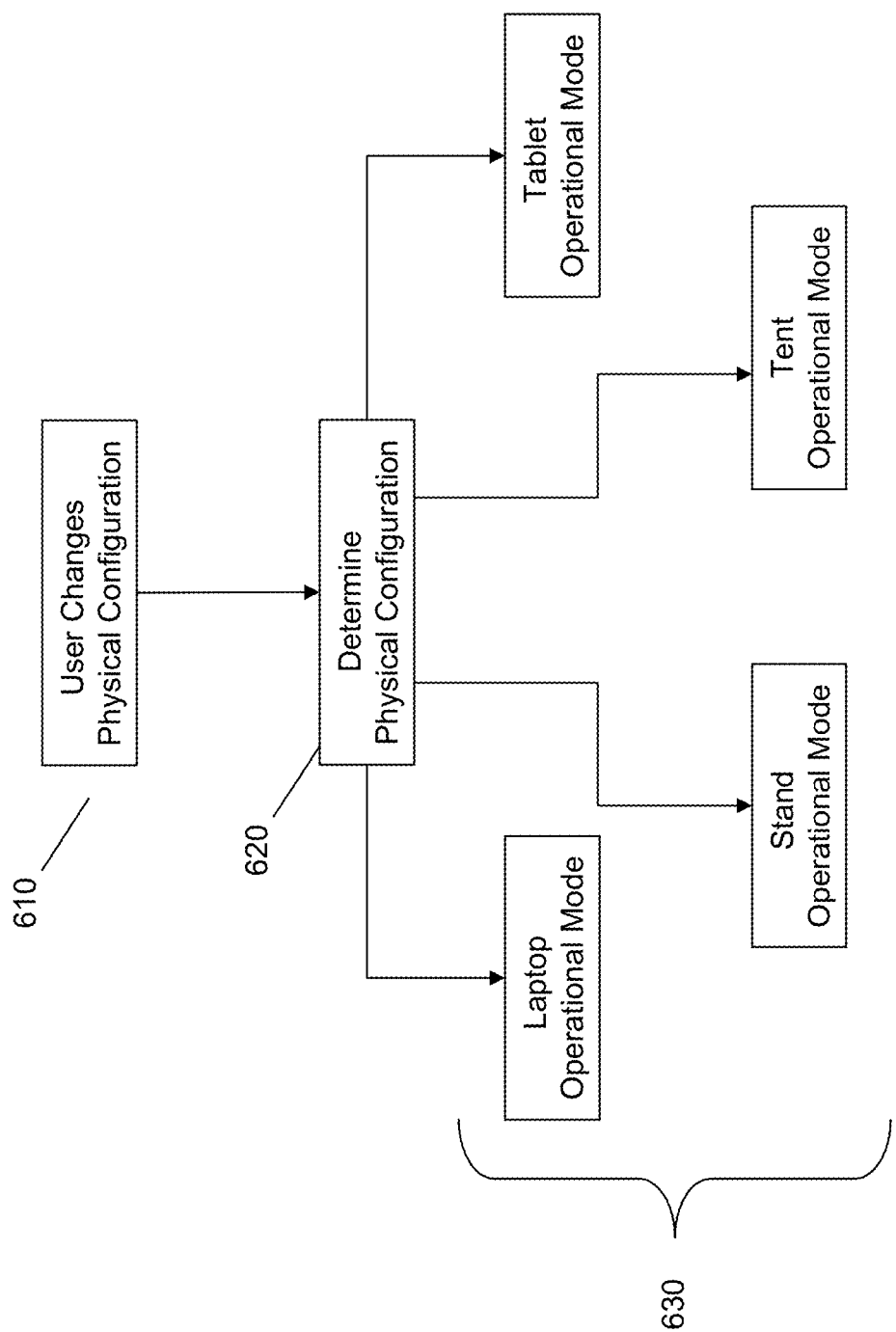
FIG. 6 illustrates an example method of operational mode determination for an information handling device.

There are several embodiments that allow for modification of a bimodal operating system. Referring to FIG. 6, for example, the additional physical configurations (e.g., stand physical configuration and tablet physical configuration) may be sensed via sensors and determined as the current physical orientation. Therefore, when the user places the device 100 into an operational mode 610, sensors may be used to first determine the physical configuration of certain components, e.g., the keyboard and screen, relative to one another and in turn determine the physical configuration at 620. In response to determining the physical configuration using the sensor input, an embodiment modifies the operational mode of the bimodal operating system such that one of the tablet operational mode and the laptop operational mode accommodates an additional operational mode, e.g., stand operational mode or tent operational mode.

The sensing functionality may be provided outside of the control of the bimodal operating system. For example, appropriately placed magnetic or other proximity sensors may be located in the display panel 103 and the base portion 102 and provide input to a subsystem or circuitry not controlled by the operating system.

As an example, once the physical configuration is determined 610, specific tablet operational mode functions of the bimodal operating system may be enabled or disabled individually to accommodate the determined non-tablet, non-laptop operational mode.

Specifically in tent operational mode and stand operational mode, display screen 106 auto-rotation may be disabled and the display screen 106 will be locked in the correct orientation for the physical configuration detected. The correct physical orientation for the display screen 106 (image thereon) of the tent operational mode will be the opposite orientation for the stand operational mode.

An embodiment may signal the bimodal operating system to remain in tablet operational mode to allow the use of an on-screen keyboard available in tablet operational mode but disabled in laptop operational mode. An embodiment may also repurpose a user accessible button/switch (e.g., auto-rotate on/off switch functionality) to allow the user finer control, e.g., of the orientation of display screen 106. Thus, a difference between tent operational mode and stand operational mode is that the display screen 106 needs to be rotated 180 degrees between the operational modes, which cannot be accomplished by simply employing a tablet operational mode of a bimodal operating system. Re-defining an auto rotate button into a 180 degree 'flip' button enables easy user control of display screen 106 orientation. This approach may be used alone or in combination with sensor input.

Another embodiment involves implementation Hall Effect sensors to determine the position of the display screen 106 relative to the keyboard 104 or base portion 102. For example, when the keyboard 104 is determined to be unusable or use is otherwise unlikely due to the keyboard 102/display screen 106 relationship, e.g., as in stand operational mode, then similar bimodal operating system modifications and controls can be performed. For example, an embodiment may send a signal to the bimodal operating system to disable or otherwise ignore input from the keyboard 102 when such a physical orientation is detected.

Therefore, embodiments permit continued use of standard bimodal operating systems for new or additional operational modes. The various embodiments detect the physical orientation and apply predetermined logic to enable/disable appropriate functions or operations of the bimodal operating system. Examples of this selective modification include but are not limited to disabling or ignoring inputs from certain input devices, locking or re-orienting the display screen 106, repurposing of button(s) of a device, or other suitable modifications that enhance the user experiences.

The embodiments may determine the physical configuration in a variety of ways or a combination of ways. For example, a user input to a physical button or soft button (i.e., software implemented) may provide information to an embodiment for modification of one or more bimodal operating system properties or actions. Additionally or alternatively, sensors, such as proximity sensors, Hall Effect sensors, accelerometers and the like may be used to determine the physical orientation by providing various signals to appropriate circuitry to determine the physical configuration. As an example, Hall Effect sensors may be used (in the display panel 103 and the base portion 102) to determine relative orientation of device components. In one embodiment, the sensors may simply detect proximity (e.g., over a threshold amount).

In another example embodiment, the sensors may make use of the geometry of the magnetic field produces to in turn give an additional data point or threshold, allowing more refined proximity determinations (and in turn, component orientation determinations) to be made. For example, the proximity sensors (e.g., Hall Effect sensors) may be positioned in an offset or reduced sensitivity configuration. This provides a feature wherein the components (e.g., the lid or display panel and the base component) will not trip the sensor until the components are quite close (e.g., less than a 45 degree opening angle, for example about 30 degrees or less). This in turn allows a more refined system detection of proximity. In the example of a Hall Effect sensor, this may include providing the sensor and the magnet in an offset position relative to one another (i.e., such that on closing, they do not overlap or entirely overlap). This offset nature of the Hall Effect sensor will allow for reduced sensitivity and thus further refinement of sensing lid or display panel opening/closing with respect to the base component.

Figure 7:
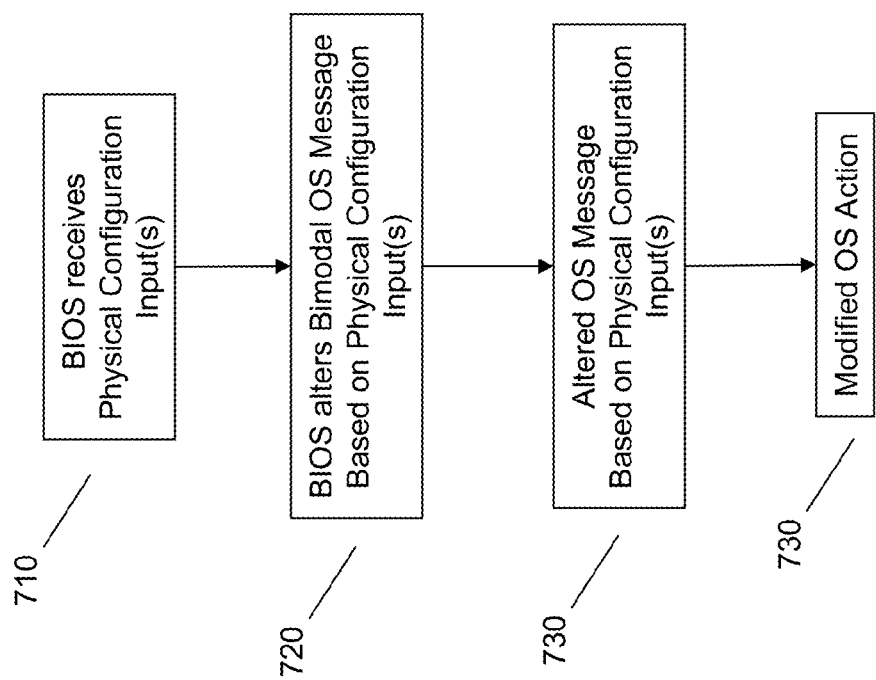
FIG. 7 illustrates an example method of altering an operation system function.

In terms of how the bimodal operating system is modified, an example embodiment is implemented outside the control of the bimodal operating system proper. Thus, in one example, referring to FIG. 7, a functionality implemented by BIOS level processing is implemented. In such an example, sensor, button press, or a combination of physical configuration related signal data is provided to the BIOS. The BIOS in turn may use an API of the bimodal operating system to alter a message received by the bimodal operating system, e.g., changing the contents of an existing message (e.g., changing a parameter such as display screen 106 rotation from one orientation to another). This message is then received by the bimodal operating system and the appropriate function or characteristic of the bimodal operating system is modified or altered selectively by an embodiment. The function of the operating system is altered selectively because not the entire set of functions are altered or modified, i.e., a mode switch is not performed by the multimodal operations system.

Additionally, it should be noted that although a bimodal operating system and various specific components (e.g., Hall Effect sensors) were used herein as representative examples, embodiments are not limited to these specific examples. Particularly, embodiments may be implemented in devices having multimodal operating systems, using other sensors or physical configuration determination devices, or suitable combinations of the foregoing. Thus, the general principles the example embodiments may be extended to a variety of different scenarios.

In this respect, while the term "circuit" or "circuitry" is used in the summary, description, and/or claims, as is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 8:
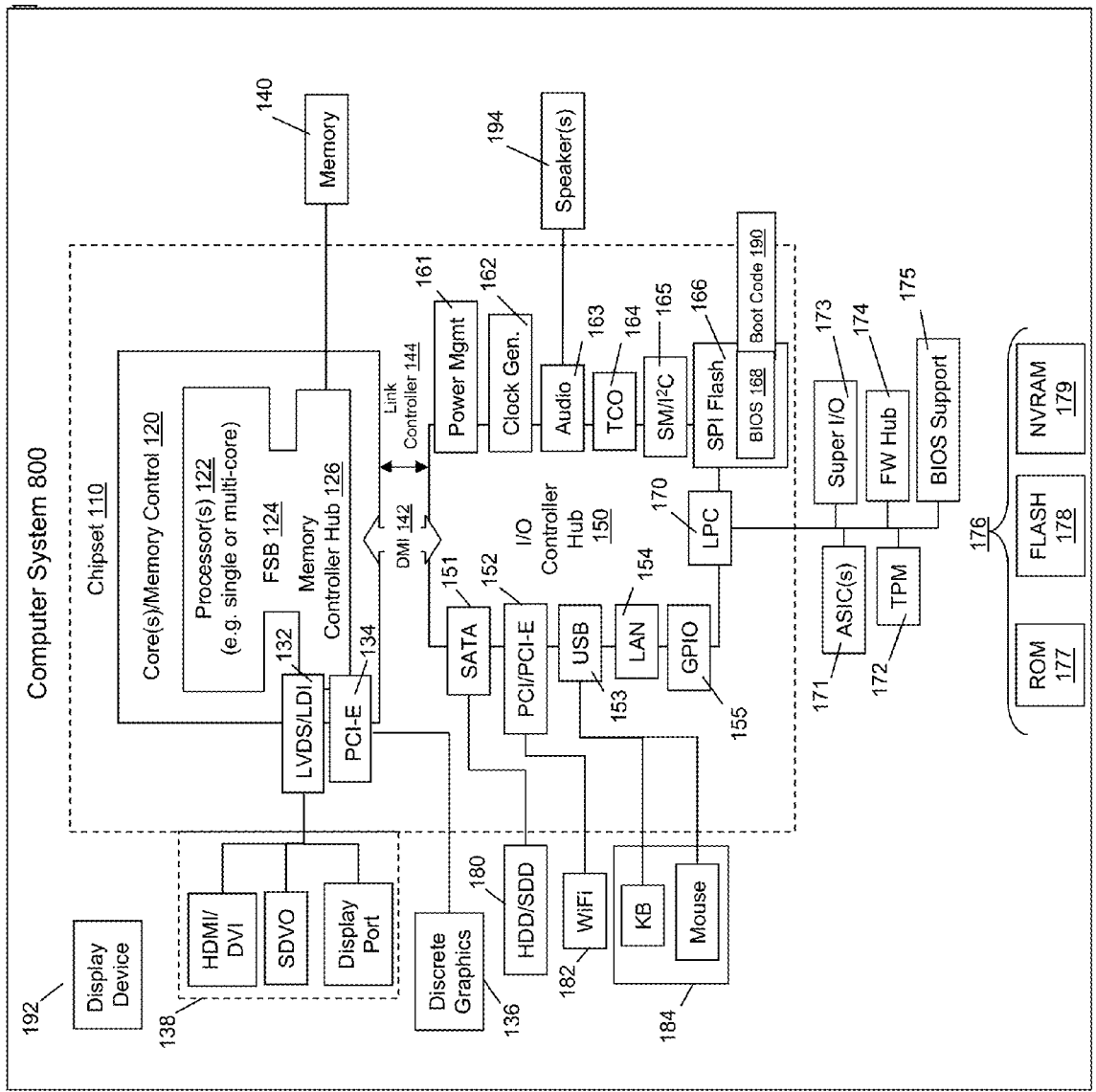
FIG. 8 illustrates example circuitry of an information handling device.

Referring to FIG. 8, while various exemplary circuits or circuitry are discussed, FIG. 8 depicts a block diagram of an illustrative exemplary computer system 800. The system 800 may be a computer system, such as one of the LENOVO TWIST or THINKPAD series of personal computers sold by Lenovo (US) Inc. of Morrisville, N.C.; however, as is apparent from the description herein, a device or other machine may include other features or only some of the features of the system 800.

The system 800 of FIG. 8 includes a so-called chipset 810 (a group of integrated circuits, or chips, that work together, chipsets) with an architecture that may vary depending on manufacturer (e.g., INTEL, AMD, etc.). The architecture of the chipset 810 includes a core and memory control group 120 and an I/O controller hub 150 that exchange information (e.g., data, signals, commands, etc.) via a direct management interface (DMI) 142 or a link controller 144. In FIG. 8, the DMI 142 is a chip-to-chip interface (sometimes referred to as being a link between a "northbridge" and a "southbridge"). The core and memory control group 120 include one or more processors 122 (e.g., single or multi-core) and a memory controller hub 126 that exchange information via a front side bus (FSB) 124; noting that components of the group 120 may be integrated in a chip that supplants the conventional "northbridge" style architecture.

In FIG. 8, the memory controller hub 126 interfaces with memory 140 (e.g., to provide support for a type of RAM that may be referred to as "system memory"). The memory controller hub 126 further includes a LVDS interface 132 for a display device 192 (e.g., a CRT, a flat panel, a projector, etc.). A block 138 includes some technologies that may be supported via the LVDS interface 132 (e.g., serial digital video, HDMI/DVI, display port). The memory controller hub 126 also includes a PCI-express interface (PCI-E) 134 that may support discrete graphics 136.

In FIG. 8, the I/O hub controller 150 includes a SATA interface 151 (e.g., for HDDs, SDDs, etc.), a PCI-E interface 152 (e.g., for wireless connections 182), a USB interface 153 (e.g., for input devices 184 such as keyboard, mice, cameras, phones, storage, etc.), a network interface 154 (e.g., LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (e.g., for speakers 194), a TCO interface 164, a system management bus interface 165, and SPI Flash 166, which can include BIOS 168 and boot code 190. The I/O hub controller 150 may include gigabit Ethernet support.

The system 800, upon power on, may be configured to execute boot code 190 for the BIOS 168, as stored within the SPI Flash 166, and thereafter processes data under the control of one or more operating systems and application software (e.g., stored in system memory 140) or by component(s) that provide input to a BIOS level process for modification of certain actions of an operating system, as described herein. An operating system, such as the bimodal operating system described herein, may be stored in any of a variety of locations and accessed, for example, according to instructions of the BIOS 168. As described herein, a device may include fewer or more features than shown in the system 800 of FIG. 8.

Information handling devices, as for example outlined in FIG. 5, may include or be connected to or otherwise couple to work with other devices, for example a keyboard having one or more keys including a recessed surface and/or a lip, as described herein. It should be noted, however, that the examples of FIGS. 1-4 and the circuitry of FIG. 5 are examples only, and other examples commensurate with this disclosure may be used. Moreover, although specific illustrations and implementations of tactile and visual cues have been focused on herein, including for example the measurements, layouts and features used in the figures as representative examples, other embodiments may be implemented using other suitable features that are commensurate with the embodiments described as examples.

As will be appreciated by one skilled in the art, various aspects may be embodied as a system, method or device program product. Accordingly, aspects may take the form of an entirely hardware embodiment or an embodiment including software that may all generally be referred to herein as a "circuit," "element" or "system." Furthermore, aspects may take the form of a device program product embodied in one or more device readable medium(s) having device readable program code embodied therewith.

Any combination of one or more non-signal device readable medium(s) may be utilized. A storage medium is a non-signal medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device, comprising:
    a display panel and a base component connected by a hinge between the display panel and the base component, the hinge supporting a laptop physical configuration, a tablet physical configuration, a tent physical configuration, and a stand physical configuration;
    one or more processors;
    an operating system having a laptop operational mode supporting the laptop physical configuration and a tablet operational mode supporting the tablet physical configuration; and
    instructions accessible to the one or more processors that when executed:
    identify a physical configuration of the information handling device, wherein the physical configuration is selected from the group consisting of: the laptop physical configuration and the tablet physical configuration;
    activate an operational mode of the operating system, wherein the operational mode is selected based on the physical configuration identified;
    identify another physical configuration selected from the group consisting of: the tent physical configuration and the stand physical configuration; and
    selectively alter, based upon the another physical configuration, a function of a currently active operational mode, wherein the altered function results in an operational mode supporting the another physical configuration of the information handling device.

2. The information handling device of claim 1, wherein selectively altering a function of a currently active operational mode comprises disabling rotation of a display screen.

3. The information handling device of claim 1, wherein selectively altering a function of a currently active operational mode comprises locking the display screen in a particular orientation.

4. The information handling device of claim 1, wherein the operating system is a multimodal operating system.

5. The information handling device of claim 1, wherein the identification of another physical configuration comprises detecting a button press.

6. The information handling device of claim 1, wherein the identification of another physical configuration comprises detecting input from one or more sensors.

7. The information handling device of claim 6, wherein the one or more sensors comprise one or more proximity sensors.

8. The information handling device of claim 7, wherein the one or more sensors comprise one or more accelerometers.

9. The information handling device of claim 7, wherein the one or more proximity sensors comprise one or more Hall Effect sensors disposed in one of the base component and the display panel, wherein a magnet corresponding to the Hall Effect sensor is offset from the Hall Effect sensor.

10. The information handling device of claim 1, wherein selectively altering a function of a currently active operational mode comprises operating a BIOS process to alter contents of a message to the operating system.

11. A method, comprising:
in an information handling device having a display panel and a base component connected by a hinge between the display panel and the base component, the hinge supporting a laptop physical configuration, a tablet physical configuration, a tent physical configuration, and a stand physical configuration and having an operating system having a laptop operational mode supporting the laptop physical configuration and a tablet operational mode supporting the tablet physical configuration, identifying a physical configuration of the information handling device, wherein the physical configuration is selected from the group consisting of the laptop physical configuration and the tablet physical configuration;
activating an operational mode of the operating system, wherein the operational mode is selected based on the physical configuration identified;
identifying another physical configuration selected from the group consisting of: the tent physical configuration and the stand physical configuration; and
selectively altering, based upon the another physical configuration, a function of a currently active operational mode, wherein the altered function results in an operational mode supporting the another physical configuration of the information handling device.

12. The method of claim 11, wherein selectively altering a function of a currently active operational mode comprises disabling rotation of a display screen.

13. The method of claim 11, wherein selectively altering a function of a currently active operational mode comprises locking the display screen in a particular orientation.

14. The method of claim 11, wherein the operating system is a multimodal operating system.

15. The method of claim 11, wherein the identification of another physical configuration comprises detecting a button press.

16. The method of claim 11, wherein the identification of another physical configuration comprises detecting input from one or more sensors.

17. The method of claim 16, wherein the one or more sensors comprise one or more proximity sensors.

18. The method of claim 11, wherein selectively altering a function of a currently active operational mode comprises operating a BIOS process to alter contents of a message to the operating system.

19. A program product, comprising: a non-signal computer readable storage device storing computer readable program code that, when executed by a processor, operate to cause a computer to perform operations comprising:
in an information handling device having a display panel and a base component connected by a hinge between the display panel and the base component, the hinge supporting a laptop physical configuration, a tablet physical configuration, a tent physical configuration, and a stand physical configuration and having an operating system having a laptop operational mode supporting the laptop physical configuration and a tablet operational mode supporting the tablet physical configuration, identifying a physical configuration of the information handling device, wherein the physical configuration is selected from the group consisting of: the laptop physical configuration and the tablet physical configuration;
activating an operational mode of the operating system, wherein the operational mode is selected based on the physical configuration identified;
identifying another physical configuration selected from the group consisting of: the tent physical configuration and the stand physical configuration; and
selectively altering, based upon the another physical configuration, a function of a currently active operational mode, wherein the altered function results in an operational mode supporting the another physical configuration of the information handling device.

* * * * *